United States Patent
Johnson

(10) Patent No.: US 7,417,336 B2
(45) Date of Patent: Aug. 26, 2008

(54) COMBINATION CURRENT HYSTERESIS AND VOLTAGE HYSTERESIS CONTROL FOR A POWER CONVERTER

(75) Inventor: James P. Johnson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 403 days.

(21) Appl. No.: 10/929,689

(22) Filed: Aug. 31, 2004

(65) Prior Publication Data

US 2006/0050458 A1   Mar. 9, 2006

(51) Int. Cl.
*H02J 3/02* (2006.01)
*H02H 3/24* (2006.01)
*H02M 7/44* (2006.01)

(52) U.S. Cl. .............................. 307/22; 307/29; 307/75; 361/92; 363/95

(58) Field of Classification Search ................... 307/18, 307/22, 29, 75, 80, 82; 361/92; 363/15, 363/95
See application file for complete search history.

(56) References Cited

U.S. PATENT DOCUMENTS

| | | | | |
|---|---|---|---|---|
| 5,550,697 | A | 8/1996 | Green et al. | 361/18 |
| 6,239,997 | B1 * | 5/2001 | Deng | 363/95 |
| 6,380,719 | B2 * | 4/2002 | Underwood et al. | 322/36 |
| 6,700,804 | B1 | 3/2004 | Reichard | 363/51 |
| 6,794,905 | B2 * | 9/2004 | Sato et al. | 326/108 |
| 6,810,339 | B2 * | 10/2004 | Wills | 702/65 |
| 7,002,305 | B2 * | 2/2006 | Kambara et al. | 315/291 |
| 7,061,139 | B2 * | 6/2006 | Young et al. | 307/45 |
| 7,183,667 | B2 * | 2/2007 | Colby et al. | 307/19 |
| 7,233,082 | B2 * | 6/2007 | Furuya et al. | 307/64 |
| 7,280,377 | B2 * | 10/2007 | Johnson | 363/97 |
| 2004/0264089 | A1 * | 12/2004 | Furuya et al. | 361/92 |
| 2005/0162098 | A1 * | 7/2005 | Ball | 315/291 |
| 2006/0250728 | A1 * | 11/2006 | Hussein | 361/18 |

* cited by examiner

*Primary Examiner*—Michael J Sherry
*Assistant Examiner*—Hal I. Kaplan
(74) *Attorney, Agent, or Firm*—Finnegan, Henderson, Farabow, Garrett & Dunner

(57) ABSTRACT

Consistent with an aspect of the present disclosure, a method is provided for controlling an AC signal, which is supplied to a load and selectively supplied to a utility grid. In response to a fault in the utility grid, the method includes decoupling the AC signal from the utility grid, and determining whether a voltage associated with the AC signal is within a desired band. The method also includes adjusting the voltage associated with the AC signal when the AC signal is outside the desired band, and comparing a magnitude of a current associated with the AC signal with a desired current value to thereby obtain a comparison result. In response to the comparison result, the current associated with the AC signal is adjusted when the voltage associated with the AC signal is within the desired band.

30 Claims, 12 Drawing Sheets

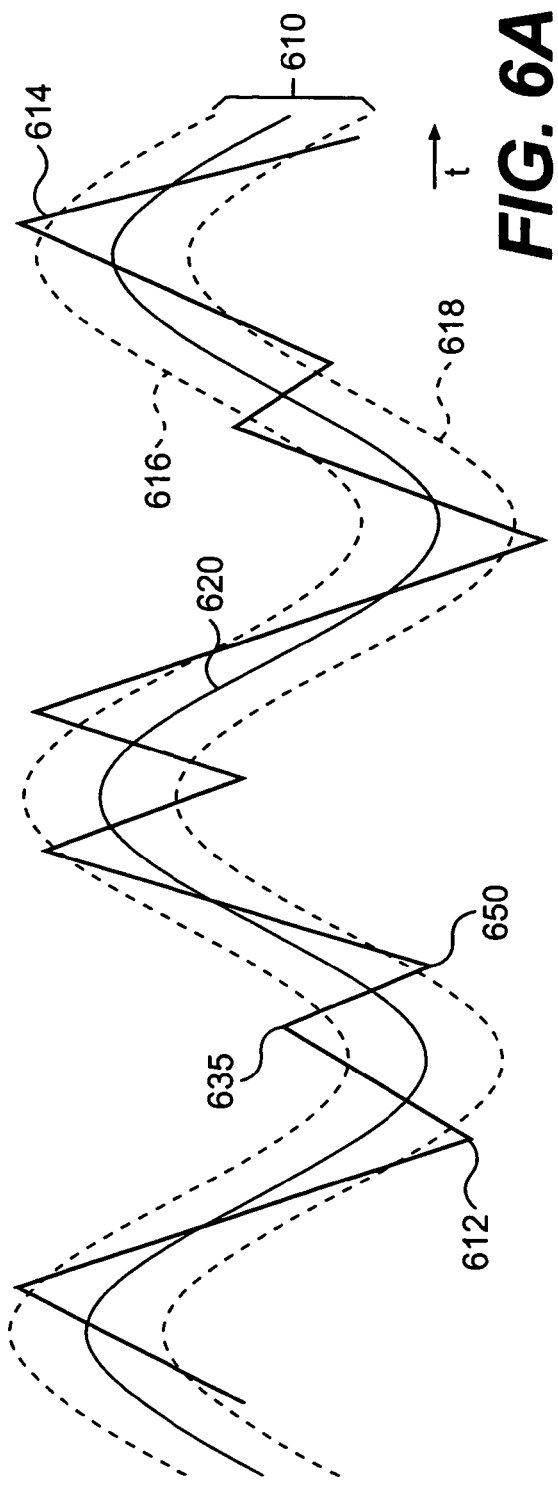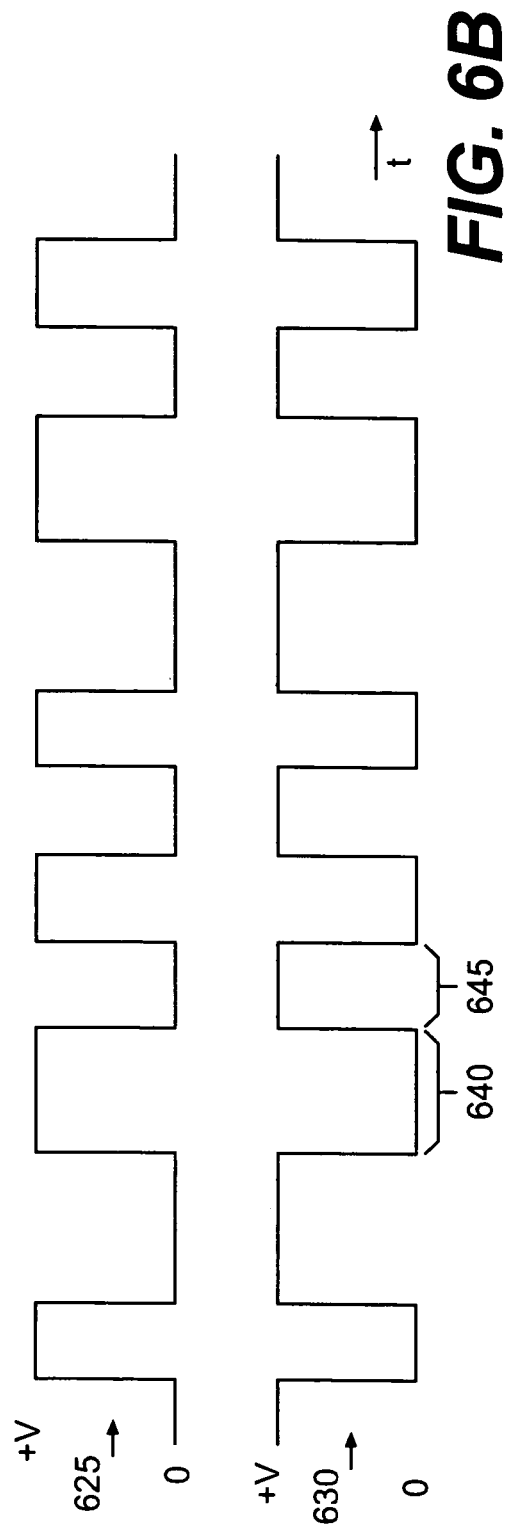

COMBINATION CURRENT HYSTERESIS AND VOLTAGE HYSTERESIS CONTROL FOR A POWER CONVERTER

TECHNICAL FIELD

The present disclosure is directed toward a power converter that provides alternating current (AC) power to a load and a utility power grid, and a related method for controlling the power converter in the event of a fault in the utility power grid.

BACKGROUND

Backup power supplies are often used to supply power when a utility power grid is disabled. Internal combustion engine driven generators are often deployed as backup power supplies. These generators, however, are relatively large and noisy, and output toxic emissions.

Fuel cells are known to generate electrical power through chemical processes having relatively minimal emissions with little environmental impact. Accordingly, fuel cells have been explored as an attractive alternative to conventional backup generators. Unlike generators, however, fuel cells typically cannot be activated within a short period of time. Accordingly, in backup power applications, fuel cells often output electrical power continuously, regardless of whether the power grid is operational. In the event power is cut off, the fuel cell supplies backup power which can be distributed by the grid to critical components, or selected areas of the grid.

U.S. Pat. No. 6,700,804 describes a backup fuel cell coupled to a utility grid through a power converter. The power converter includes an inverter, which receives a direct current (DC) input voltage from the fuel cell, and outputs an AC signal to a utility distribution system.

In certain applications, however, a critical load, such as a bank of computers or a building housing sensitive equipment, is connected to the power converter in addition to the utility power grid. During normal operation, the utility power grid and the power converter supply AC power to the critical load. The current output from the power converter is regulated in a known manner, and the critical load voltage is set to the utility power grid voltage. When a fault occurs in the utility power grid, however, the power converter alone supplies AC power to the critical load. Although, the current is controlled, the voltage associated with the AC power is not, and may depend upon the level of loading of the critical load. Thus, the voltage associated with the AC signal output from the power converter can spike and cause damage to the critical load, or fall below levels required by the critical load.

The present disclosure is directed to overcome one or more of the shortcomings in the prior art.

SUMMARY OF THE INVENTION

Consistent with an aspect of the present disclosure, a method is provided for controlling an AC signal, which is supplied to a load and selectively supplied to a utility grid. In response to a fault in the utility grid, the method includes decoupling the AC signal from the utility grid, and determining whether a voltage associated with the AC signal is within a desired band. The method also includes adjusting the voltage associated with the AC signal when the AC signal is outside the desired band, comparing a magnitude of a current associated with the AC signal with a desired current value to thereby obtain a comparison result, and adjusting the current associated with the AC signal in response to the comparison result when the voltage associated with the AC signal is within the desired band.

Consistent with a further aspect of the present disclosure, a power control system is provided which includes an AC signal source, switch circuit, and control circuit. The AC signal source is coupled to a load, and generates an AC signal, and the switch circuit is configured to selectively couple the AC signal source to a utility grid. The control circuit is coupled to the AC signal source, such that when a voltage associated with the AC signal is outside a desired band, the control circuit controls the switch circuit to decouple the AC signal source from the utility grid, and adjusts the current and voltage associated with the AC signal.

Consistent with an additional aspect of the present disclosure, a power control system is provided which includes an inverter circuit, current transducer circuit, voltage transducer circuit, switch circuit, pulse generating circuit, and control circuit. The inverter circuit is configured to receive a DC signal and supply an AC signal to a load, and the current transducer circuit is configured to receive the AC signal and output a current sense signal in response to a current associated with the AC signal. The voltage transducer circuit is configured to receive the AC signal and output a voltage sense signal in response to a voltage associated with the AC signal. In addition, the switch circuit is configured to selectively supply the AC signal to a utility grid, and the pulse generating circuit is configured to output a pulse signal in response to a utility AC signal present in the utility grid. Further, the control circuit is configured to receive the current sense signal, the voltage sense signal and the pulse signal, and output control signals to the inverter circuit in response thereto.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIGS. 6A and 6B illustrate waveforms and timing diagrams, respectively, in accordance with another aspect of the present disclosure;

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
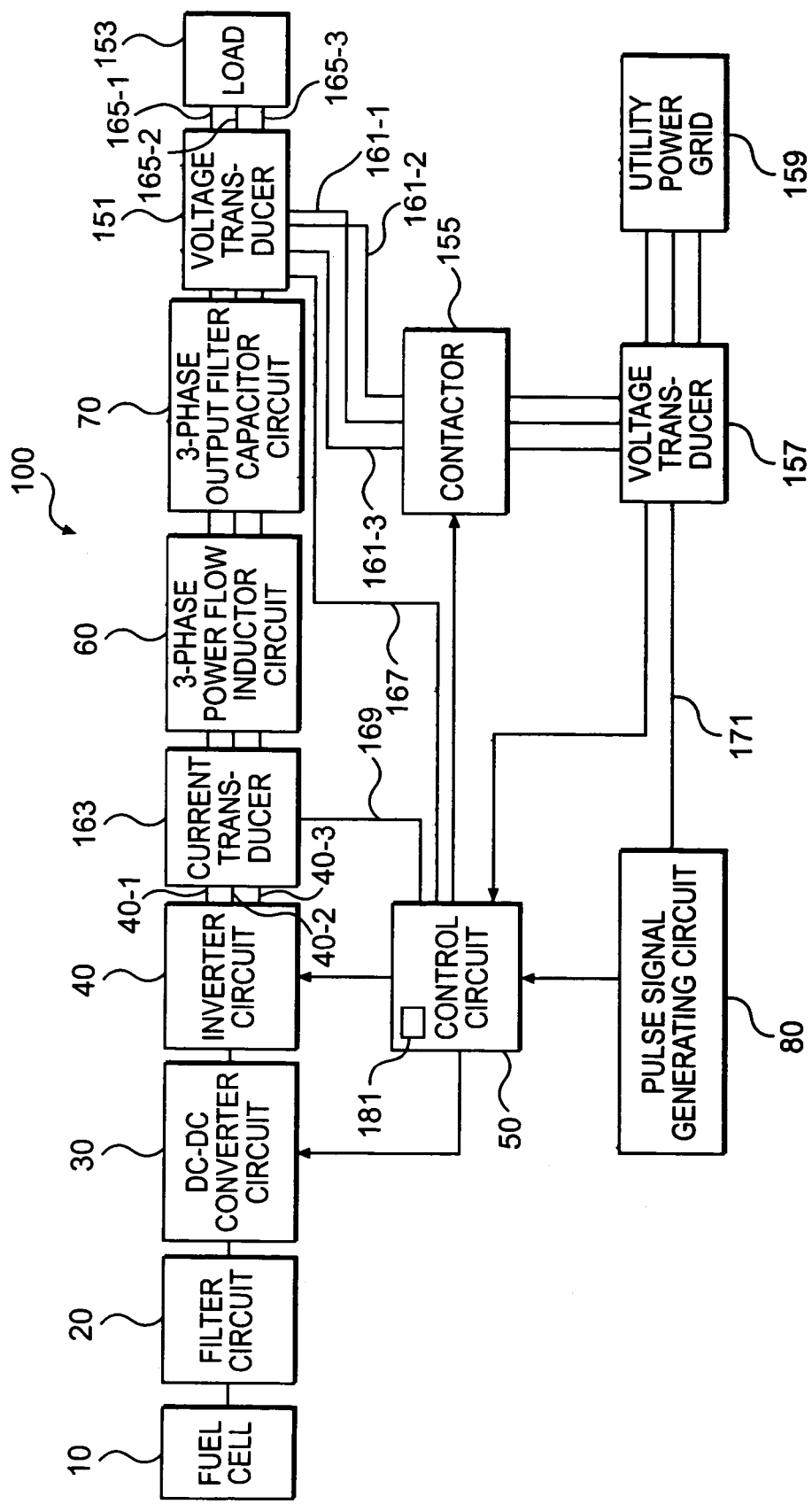
FIG. 1 illustrates a block diagram of a power converter consistent with an aspect of the present disclosure.

Consistent with an aspect of the present disclosure, FIG. 1 illustrates a power converter 100, which receives an output from fuel cell 10. Fuel cell 10 is typically a backup fuel cell for supplying auxiliary power to a utility power grid 159 and a load 153, and the output to power converter 100 is typically a high current, low voltage DC signal. The DC signal is applied to a filter circuit 20, including a contactor 25 (see FIG. 2) for selectively supplying the fuel cell output to power converter 100. Filter circuit 20 is provided to smooth out any variations in the output of fuel cell 10.

DC-DC converter circuit 30 receives the filtered DC signal from filter 20, and converts the received low voltage signal to a higher voltage DC signal. The magnitude or level of the voltage output of DC-DC converter circuit 30 corresponds to an amplitude of the AC signal output from power converter 100, and may be controlled in response to control signals output from control circuit 50, as discussed in greater detail below. Control circuit 50 can include a microprocessor, digital signal processor (DSP) or other suitable hardware and/or software combination.

Inverter circuit 40 receives the DC signal output from DC-DC converter circuit 30, and outputs an AC signal in response thereto. The AC signal may be three phase, so that three separate AC signals or AC phase signals are respectively output on lines 40-1, 40-2 and 40-3. The AC phase signals are then supplied to a current transducer circuit 163, which outputs one or more current sense signals on line 169 in response to a current associated with one or more of the AC phase signals.

Each of lines 40-1 to 40-3 passes through current transducer 163 to feed three phase power flow inductor circuit 60, which includes an inductor (see inductors 60-1, 60-2, 60-3 in FIG. 4) associated with each AC phase signal. Each of inductors 60-1, 60-2, and 60-3 also constitutes part of a three phase output filter capacitor circuit 70, which is configured to smooth and remove distortions in the AC phase signals. The AC phase signals are then supplied to a load 153 on respective lines 165-1, 165-2, and 165-3 via voltage transducer circuit 151. Load 153 may be a critical load including a bank of computers or other sensitive electronic equipment, or may be an office building requiring a reliable source of power. Collectively, inverter circuit 40, three phase power flow inductor circuit 60, and three phase output filter capacitor circuit 70 can constitute an AC signal source.

Voltage transducer circuit 151 outputs a voltage sense signal on line 167 in response to a voltage associated with one or more of the AC phase signals, and also supplies the AC phase signals to a switch circuit or contactor 155 on corresponding lines 161-1, 161-2, and 161-3. The AC phase signals are further passed to voltage transducer circuit 157, and then to utility power grid 159. Voltage transducer circuit 157 also supplies a voltage sense signal in response to a voltage associated with one or more AC phase signals present on lines 161-1, 161-2, and 161-3. Pulse signal generating circuit 80 receives the voltage sense signal via line 171 from voltage transducer 157 and outputs a pulse signal (to be discussed in greater detail below) to control circuit 50.

In response to signals carried by lines 167 and 169, as well as the pulse signal output from pulse generating circuit 80, a control circuit 50 outputs control signals to inverter circuit 40.

Control circuit 50 also opens and closes contactor 155 in response to a fault present in utility grid 159, as detected by voltage transducer 157.

Figure 2:
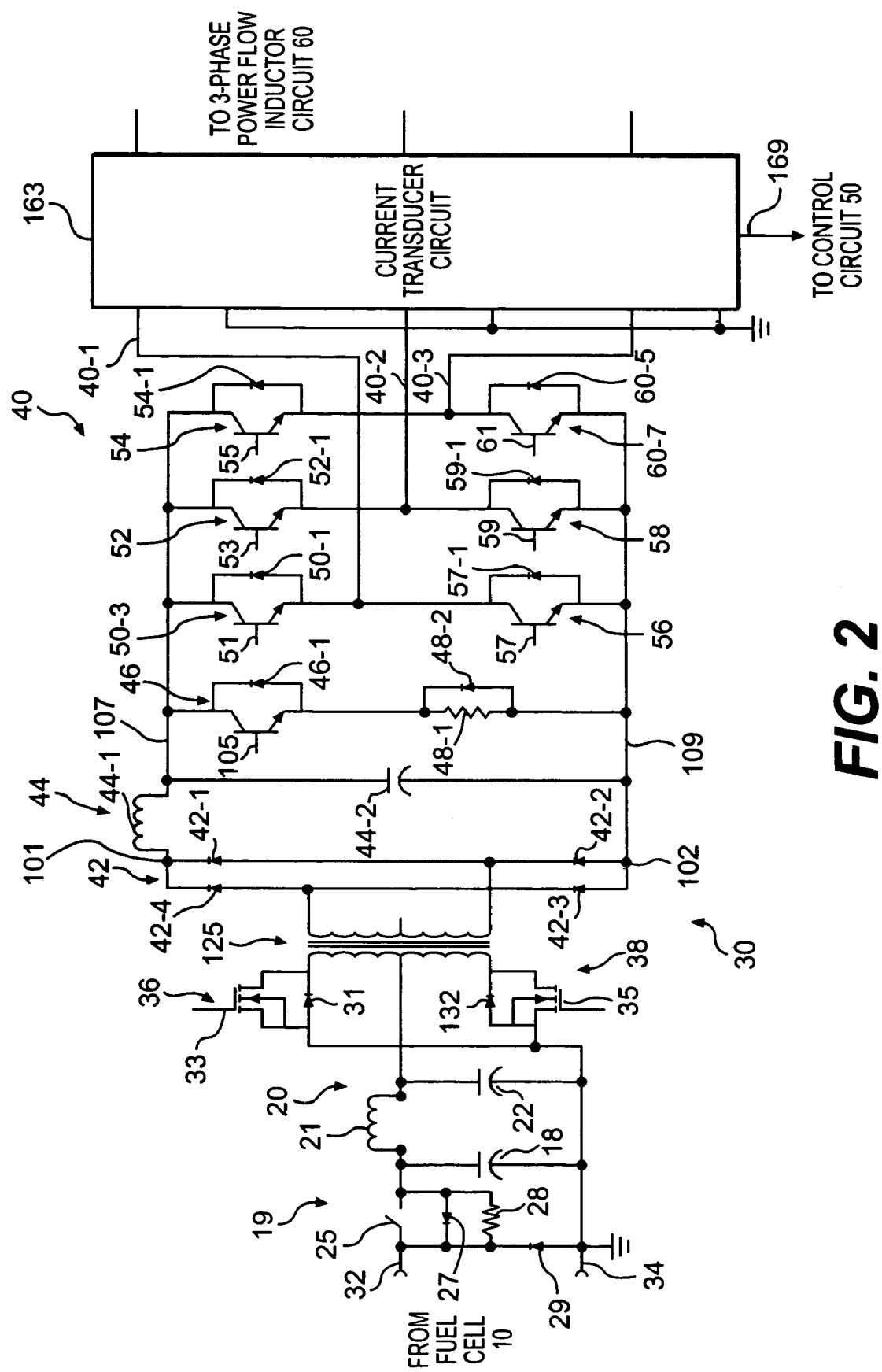
FIG. 2 illustrates a circuit schematic of a portion of the power converter shown in FIG. 1.

FIG. 2 illustrates portions of power converter 100 in greater detail. Power converter 100 includes an input section 19 including terminals 32 and 34, across which the input fuel cell DC voltage is applied. Input section 19 includes contactor 25 connected in parallel with a diode 27 and precharge resistor 28. An additional diode 29 is connected to electrically isolate terminal 32 from terminal 34. When the fuel cell DC voltage is initially applied across terminals 32 and 34, contactor 25 stays open to protect components in power converter 100 from potential current surges. Accordingly, a capacitor 18 charges through the precharge resistor 28 with an RC time constant substantially equal to the product of the resistance of resistor 28 and the capacitance of capacitor 18. Once the voltage across capacitor 18 reaches a predetermined threshold value, e.g., 50 V, contactor 25 closes, thus bypassing resistor 28 so that capacitor 18 continues to charge up to the full fuel cell DC input voltage, but with a time constant based upon the capacitance of a filter capacitor 22, fuel cell output resistance, and line and connection parasitic resistances.

The higher the predetermined threshold voltage, the more time is required before contactor 25 closes. However, less current is required to fully charge capacitor 18 once the threshold is reached. In addition, a peak current surge during such charging is reduced.

In order to disconnect power converter 100 from fuel cell 10, contactor 25 is opened, and diode 27 acts as a short across resistor 28, thereby reducing the time required to discharge capacitor 18.

When contactor 25 is closed, however, the fuel cell DC voltage is applied to filter circuit 20 including an inductor 21 and capacitor 22. Filter circuit 20 is provided to substantially eliminate variations in the fuel cell DC voltage so that a substantially smoothed DC voltage signal is applied to DC-DC converter circuit 30.

DC-DC converter circuit 30 includes transistors 36 and 38 configured in a conventional "push-pull" configuration with transformer circuit portion 125. Diodes 31 and 132 are connected in parallel with transistors 36 and 38 to assure proper current flow to transformer 125. Typically, control circuit 50 applies control signals to gates 33 and 35 of transistors 36 and 38, respectively, so that one of these transistors is rendered conductive while the other is turned off. Thus, for example, when a relatively high control signal is applied to gate 33, transistor 36 is turned on, while a low control signal turns off transistor 38. As a result, current flows down (in FIG. 2) through the primary windings of transformer 125, and a positive voltage is output from transformer 125. When transistors 36 and 38 and turned off and on, respectively, however, current flows through the transformer windings in an opposite direction, thereby creating a negative voltage output from transformer 125.

Bridge circuit 42 is coupled to transformer 125, and includes diodes 42-1, 42-2, 42-3 and 42-4 to rectify the output of transformer circuit 125 in a known manner. Filter 44, including inductor 44-1 and capacitor 44-2, is further provided to output a substantially constant DC voltage across capacitor 44-2 by averaging pulsed voltages generated across points 101 and 102 of bridge circuit 42. Typically, DC-DC converter circuit 30 maintains conductor or rail 107 at a positive potential +Vdc, and conductor or rail 109 is maintained at a minus potential −Vdc.

Operation of DC-DC converter circuit 30 will next be described with reference to FIGS. 3A and 3B, which are exemplary timing diagrams of signals VGATE33, VGATE35, VRECT and V0. VGATE33 and VGATE35 correspond to control signals applied to the gates 33 and 35, respectively. VRECT is the voltage output across points 101 and 102 of bridge circuit 42, and V0 is the voltage across capacitor 44-2, i.e., the voltage applied as an input to inverter circuit 40.

Figure 3A:
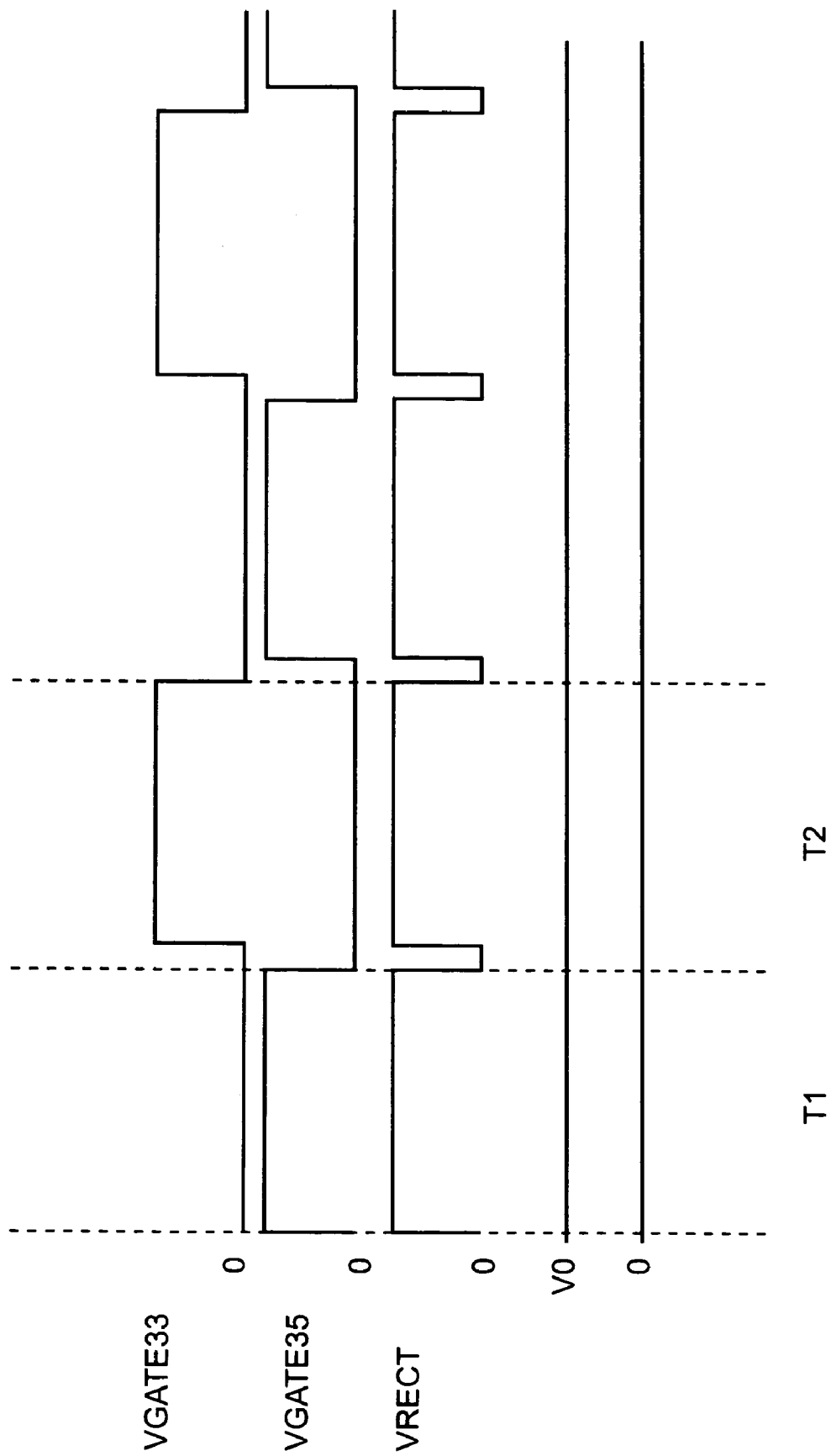
FIGS. 3A and 3B are timing diagrams in accordance with an additional aspect of the present disclosure.

In FIG. 3A, during time period T1, VGATE33 is relatively low, while VGATE35 is at a relatively high potential. In time period T2, however, VGATE35 is low, while VGATE33 is high. Thus, during substantially all of either time period T1 or time period T2, either one of VGATE33 or VGATE35 is at a high level, and control signals VGATE33 and VGATE35 have a 100% duty cycle. As a result, current flows through the windings of transformer 125 in a first direction during time period Ti and a second direction during time period T2, and VRECT is at a relatively high voltage for substantially both time periods T1 and T2. Filter 44 averages VRECT during time periods T1 and T2 so that the resultant output voltage is at a maximum value, V0.

Figure 3B:
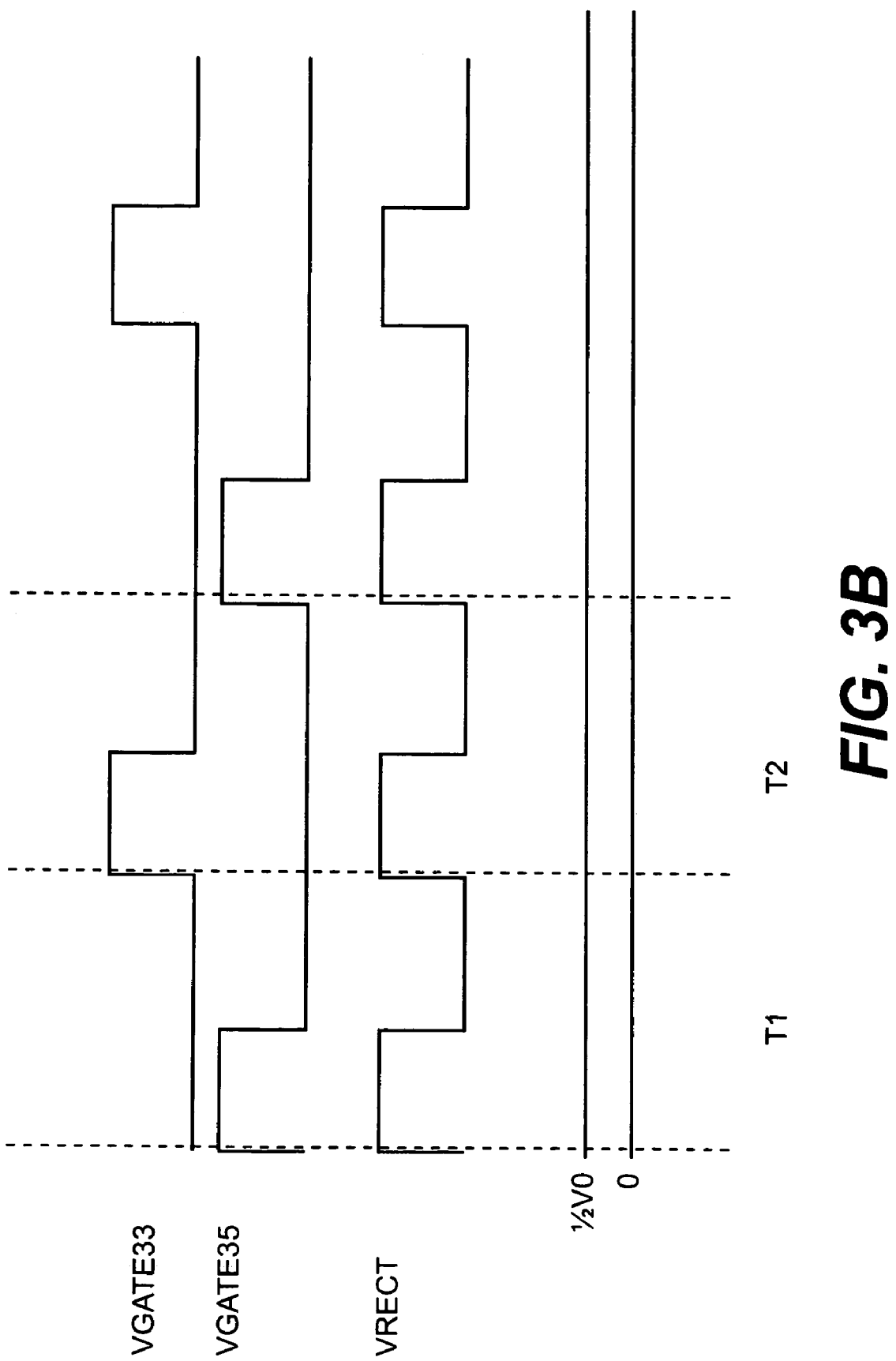

In FIG. 3B, VGATE35 is high for only about half of the duration of time period T1, and VGATE33 is high for substantially half of time period T2. Accordingly, VGATE35 and VGATE33 have a 50% duty cycle in this case, and VRECT is at a relatively high voltage for half of time periods T1 and T2. As a result, when averaged by filter 44, the voltage applied to the input to inverter 40 is ½ V0, or half of that associated with the 100% duty cycle discussed above. Accordingly, by adjusting the duty cycle of control signals applied to gates 33 and 35, for example, the voltage level applied to inverter circuit 40 can be changed.

Returning to FIG. 2, inverter circuit 40 will next be described. Inverter circuit 40 includes a plurality of switching elements, for example, transistors 46, 50-3, 52, 54, 56, 58 and 60-7. Diodes 46-1, 50-1, 52-1, 54-1, 57-1, 59-1 and 60-5 are respectively coupled between the emitter and collector of each of transistors 46, 50-3, 52, 54, 56, 58 and 60-7. Diode 46-1, for example, provides an alternative current path to a path through transistor 46 in the event current does not flow through transistor 46, even though the transistor is turned on. Diodes 50-1, 52-1, 54-1, 57-1, 59-1 and 60-5 likewise provide alternate current paths bypassing transistors 50-3, 52, 54, 56, 58 and 60-7, respectively. Diode 48-2 is included in order to provide a low resistance path in parallel to resistor 48-1 in the event the potential on rail 109 is higher than the potential at a point between resistor 48-1 and transistor 46.

Transistor 46 and resistor 48-1 and diode 48-2 constitute a leg of inverter circuit 40 to facilitate "resistive grid" mode operation of the inverter circuit 40. In resistive grid mode, a DC voltage can be output from a connection between transistor 46 and resistor 48-1. The resistive grid DC voltage can be used to independently test DC-DC converter circuit 30 and operation of power converter 100 as a DC power source, such as when evaluating fuel cell durability. Alternatively, resistive grid mode can be employed when no utility connection is available.

During resistive grid mode, control signals output from control circuit 50 are supplied to bases 51, 53, 55, 57, 59 and 61 of transistors 50-3, 52, 54, 56, 58 and 60-7, respectively, to turn off and render each of these transistors non-conductive. A relatively high potential is supplied to base 105 to turn on transistor 46. Current therefore flows through transistor 46 and resistor 48-1 to negative (−) Vdc rail 109. The potential drop across resistor 48-1 can then be measured for evaluation purposes, for example, as noted above.

Alternatively, inverter 40 can operate in a "utility interactive mode" in which control signals output from control circuit are used to drive each of bases 51, 53, 55, 59 and 61, while transistor 46 is turned off and non-conductive. Transistors 50-3 and 56 constitute one leg of inverter circuit 40 coupled to line 40-1, and are controlled through application of appropriate control signals to bases 51 and 57, respectively. Transistors 50-3 and 56 are configured to supply varying amounts of current to line 40-1 so that an alternating current/voltage signal is output on line 40-1, as discussed in greater detail below. The control signals are output from control circuit 50 to generate one phase of a three phase AC signal on line 40-1. Similarly, transistors 52 and 58 constitute a second leg for outputting a second phase signal of the AC signal on line 40-2 in response to further control signals applied to bases 53 and 59, respectively, and transistors 54 and 60-7 form a third leg of inverter circuit 40 for outputting the third phase on line 40-3 in accordance with additional control signals applied to corresponding bases 55 and 61. Each of lines 40-1, 40-2, and 40-3 supplies a corresponding AC phase signal to a known current transducer circuit 163, which outputs a current sense signal to control circuit 50 on line 169. The current sense signal is output in response to a current associated with one or more AC phase signals present on lines 40-1, 40-2, 40-3.

Figure 4:
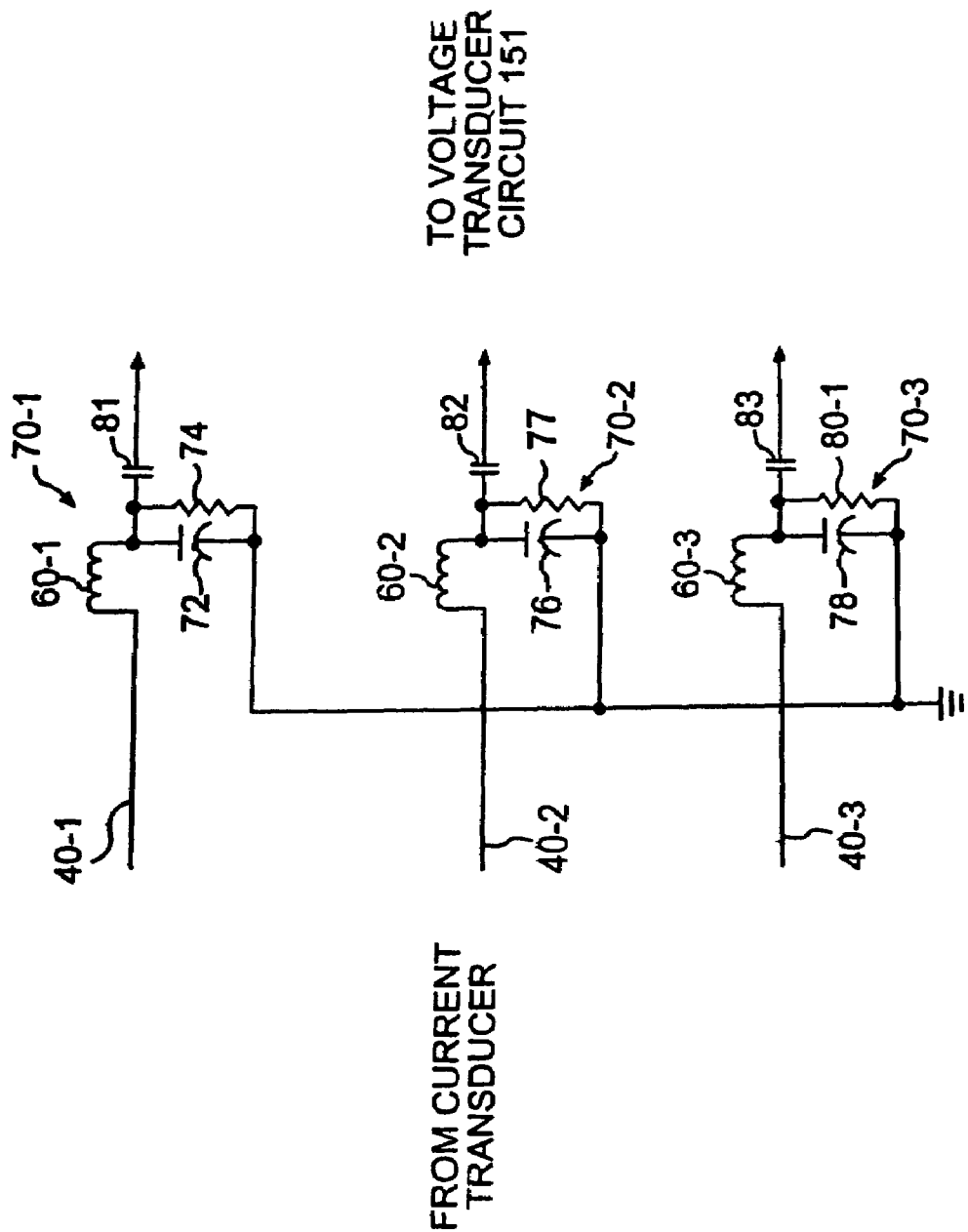
FIG. 4 illustrates a circuit schematic of an additional portion of the power converter shown in FIG. 1.

As seen in FIG. 4, each line 40-1, 40-2 and 40-3 passes through current transducer circuit 163 and is coupled to a corresponding one of inductors 60-1, 60-2 and 60-3. Each inductor serves to regulate power flow associated with each of AC phase signal carried by lines 40-1, 40-2 and 40-3. In addition, inductors 60-1, 60-2 and 60-3 constitute part of filtering circuits 70-1, 70-2 and 70-3. As further shown in FIG. 4, each filtering circuit further includes capacitors and a resistor. For example, filtering circuit 70-1 includes capacitors 72 and 81, filtering circuit 70-2 includes capacitors 76 and 82, and filtering circuit 70-3 includes capacitors 78 and 83. In addition, filtering circuits 70-1, 70-2 and 70-3 include respective resistors 74, 77 and 80-1. Filtering circuits 70-1, 70-2 and 70-3 are configured to output a substantially distortion-free AC waveform to load 153 via voltage transducer circuit 151.

Figure 5:
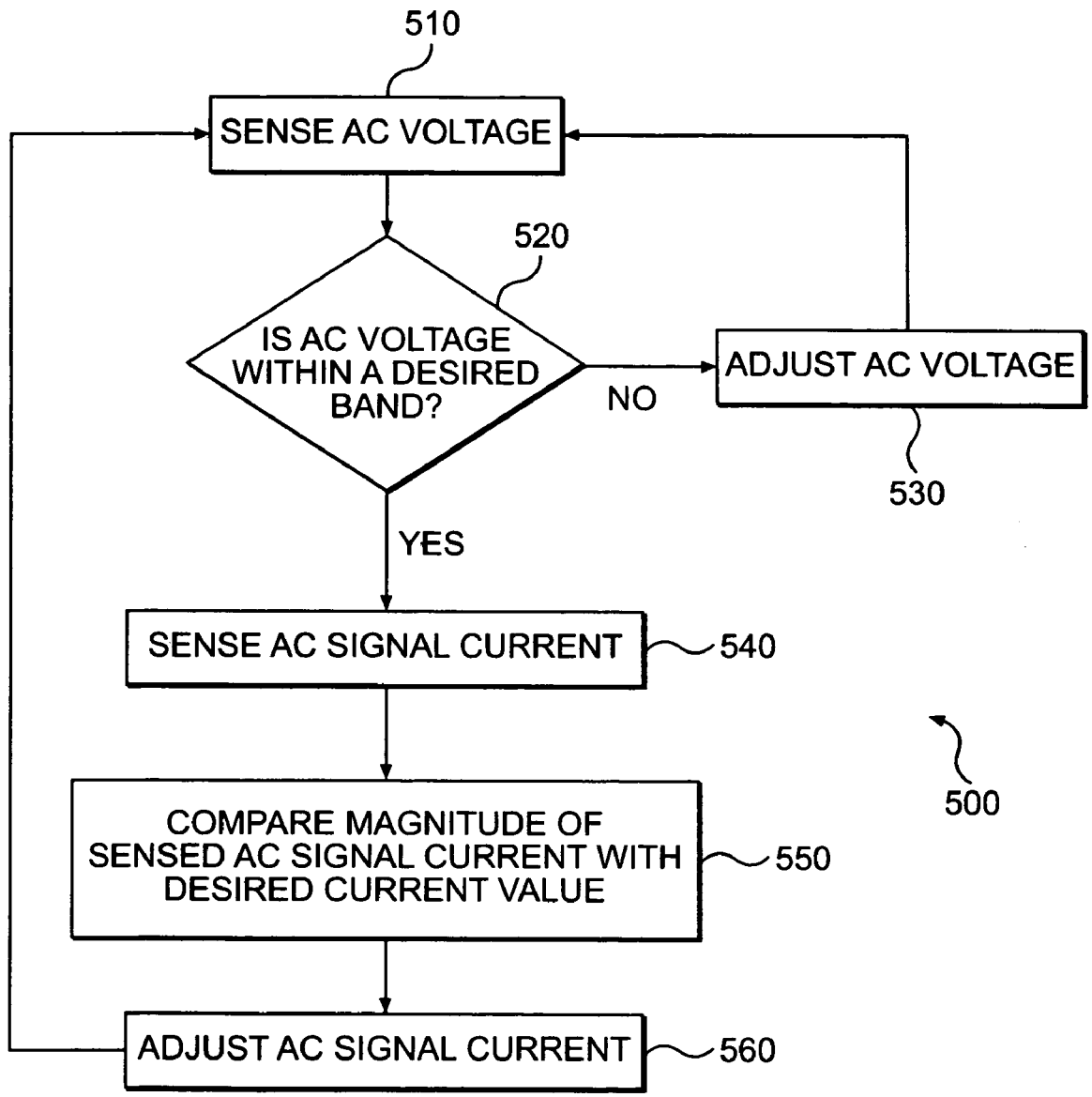
FIG. 5 illustrates a flow chart consistent with a further aspect of the present disclosure.

Operation of power converter 100 will next be described with reference to flowchart 500 shown in FIG. 5. In step 510, a voltage associated with an AC signal or AC phase signal present on line 40-1, for example, is sensed by voltage transducer circuit 151, and the resulting voltage sense signal is supplied on line 167 to control circuit 50. In step 520, based on the received voltage sense signal, control circuit 50 determines whether the AC voltage is within a desired band 610 about a preferred voltage waveform 620, which typically corresponds to the utility AC voltage (see FIG. 6A). Desired band 610 represents a range of acceptable voltages, which can be safely applied to, and maintain operation of, load 153. In one example, the range of voltage values is within ±5% of the AC utility voltage.

In the event of a fault, utility power grid 159 does not provide an AC voltage to load 153. Rather, both AC current and voltage are supplied to load 153 on lines 165-1 to 165-3 from power converter 100. Since the voltage present on these lines is not regulated or controlled, the voltage will likely either exceed or fall below the desired band 610 of voltages appropriate for load 153. Based on the sense signal received from voltage transducer circuit 151, control circuit 50 determines that the AC signal voltage is outside desired band 610, and operates in a voltage control mode to adjust the voltage present on lines 40-1, 40-2, and 40-3. In addition, control circuit 50 supplies a control signal to open contactor 155, thereby decoupling inverter circuit 40 and the AC signals present on lines 40-1, 40-2, and 40-3 from utility power grid 159.

Voltage adjustment in step 530 will next be described with reference to FIGS. 6A, 6B, and FIG. 2. In FIG. 6A, the voltage associated with the AC signal output from inverter 40 on line 40-1, for example, is AC signal voltage 614. Consistent with an aspect of the present disclosure, AC signal voltage 614 is controlled to lie within desired band 610, which is bounded by dashed lines 616 and 618 about preferred voltage waveform 620. Accordingly, when the AC signal voltage 614 falls below the desired band 610 at point 612, for example, control circuit 50 sets control signal 625 supplied to base 51 (see FIGS. 2, 6B) to a relatively high value (+V) to turn on transistor 50-3, and sets control signal 630 applied to base 57 to a relatively low value (e.g., 0 V) to turn off transistor 56. Transistor 50-3 is thus rendered conductive, while transistor 56 is cutoff, and since both transistors are coupled to line 40-1, the potential on line 40-1 and thus AC signal voltage 614 is pulled up to the potential of rail 107.

As further shown in FIG. 6A, AC signal voltage 614 increases during time interval 640 into desired band 610, and can even exceed desired band 610 at point 635. When this occurs, control circuit 50 sets control signal 625 supplied to base 51 to a low value (0V) in FIG. 6B, and sets control signal 630 output to base 57 to a high value (+V). As a result, transistor 56 is turned on and transistor 50-3 is turned off, thereby pulling the voltage on line 40-1 down to the lower potential of rail 109 during time interval 645. At point 650, however, AC signal voltage 614 is again below desired band 610, and is increased by setting control signals 625 and 630 in a manner similar to that described above.

Thus, AC signal voltage 614 continues to be adjusted, through voltage hysteresis control, by appropriately setting control signals 625 and 630 to turn on and off transistors 50-3 and 56. AC signal voltage 614, therefore, is increased or decreased, as necessary to be within desired band 610.

When AC signal voltage 614 is within desired band 610, control circuit 50 turns to a current control mode, in which the current associated with the AC signals output from inverter circuit 40 on lines 40-1 to 40-3 is adjusted to substantially equal a desired current. Control circuit 50 remains in the current control mode even in the absence of a connection to utility power grid 159, so long as AC signal voltage 614 remains within desired band 610. By controlling both current and voltage while the power converter 100 is disconnected from utility power grid 159, a smoother and more stable AC signal is output to load 153, compared to either voltage or current control alone. If power converter 100 is connected to utility power grid 159, however, power converter 100 remains in current control mode, and the AC signal current may optionally be synchronized with the utility AC voltage.

Returning to FIG. 5, when AC signal voltage 614 is within desired band 610, current associated with the AC signal on line 40-1, i.e., the AC signal current, is sensed by current transducer circuit 163 (step 540), and a current sense signal associated with the AC signal current is supplied to control circuit 50 on line 169. The magnitude of the sensed current is determined by control circuit 50 based on the current sense signal, and compared with a desired current value (step 550) to obtain a comparison result. Based on the comparison result, the AC signal current is adjusted (step 560). Once the AC signal current is adjusted, control circuit 50 returns to step 510, and the above process is repeated.

Figure 7A:
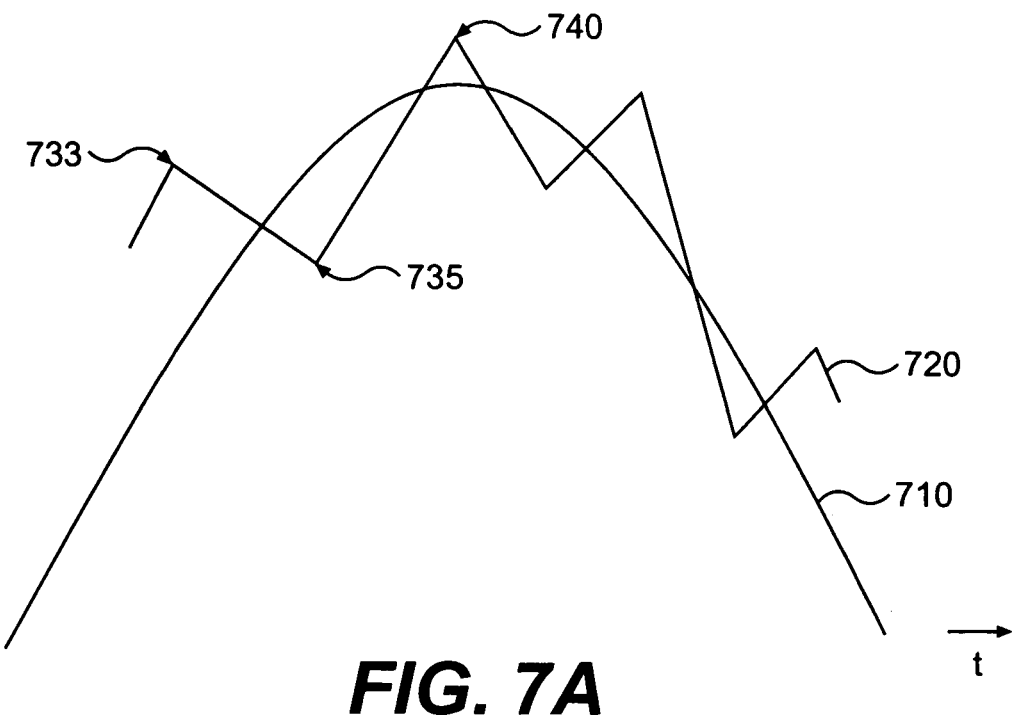
FIGS. 7A and 7B illustrate additional waveforms and timing diagrams, respectively, in accordance with an aspect of the present disclosure.
Figure 7B:
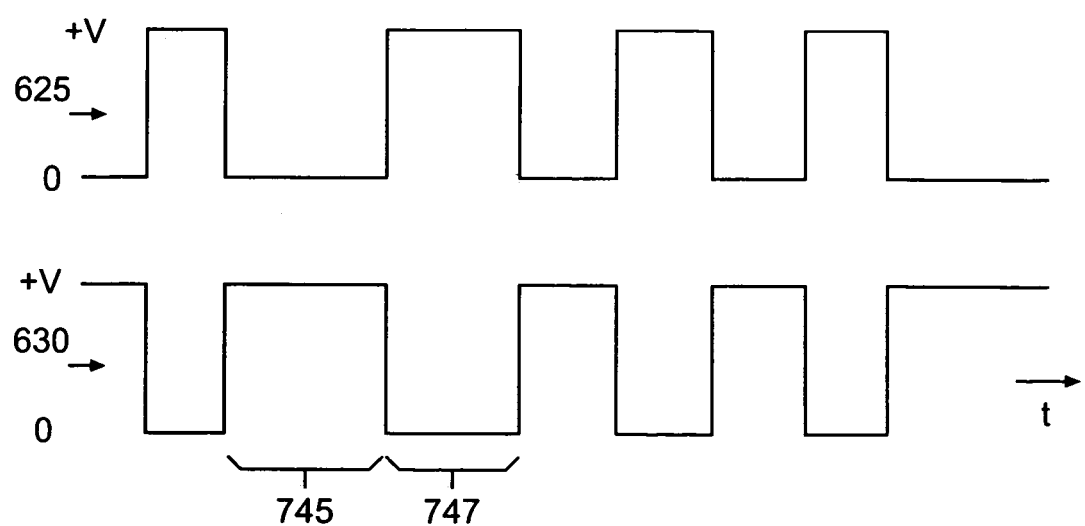

AC signal current adjustment through "current hysteresis" will next be described with reference to FIGS. 2, 7A, 7B. In FIG. 7A, the current associated with the AC signal output from inverter 40 on line 40-1, for example, is AC signal current 720. Consistent with a further aspect of the present disclosure, AC signal current 720 is controlled to substantially equal a desired AC signal current waveform 710, typically that associated with the utility AC signal. Accordingly, when the AC signal current rises above the desired AC signal current waveform 710 at point 733, for example, control circuit 50 compares the instantaneous magnitude of AC signal current 720 during time interval 745 with the desired AC signal current waveform 710 for that time interval. Based on a result of that comparison, control circuit 50 sets control signal 625 supplied to base 51 (see FIGS. 2, 7B) to a relatively low value (0 V) to turn off transistor 50-3, and sets control signal 630 applied to base 57 to a relatively high value (e.g., +V) to turn on transistor 56. Transistor 50-3 is thus cuttoff, while transistor 56 is rendered conductive, and since both transistors are coupled to line 40-1, the potential on line 40-1 and thus AC signal current is pulled low toward the potential of rail 109.

As further shown in FIG. 7A, AC signal current 720 therefore decreases during time interval 745 below the desired AC signal current waveform 710 to point 735. Control circuit 50 thus sets control signal 625 supplied to base 51 to a high value (+V) in FIG. 7B, and sets control signal 630 output to base 57 to a low value (0V). As a result, transistor 50-3 is turned on and transistor 56 is turned off, thereby pulling the voltage on line 40-1 up to the higher potential of rail 107 during time interval 747. At point 740, however, AC signal current 720 is again above the desired AC signal current waveform 710, and is therefore decreased by setting control signals 625 and 630 in a manner similar to that described above.

Thus, the instantaneous magnitude of AC signal current 720 is continuously compared with corresponding values of the desired AC signal current waveform 710 stored in memory 181 of control circuit 50 (see FIG. 1). Based on the results of these comparisons, control circuit 50 appropriately sets control signals 625 and 630 to turn on and off transistors 50-3 and 56, thereby increasing or decreasing AC signal current 720 as necessary to substantially equal the desired AC signal current waveform 710.

Once the fault in utility power grid 159 is corrected, voltage transducer 157 senses the presence of the utility AC signal in utility power grid 159 and supplies an appropriate signal to control circuit 50. Control circuit 50, in turn, outputs a contactor control signal to close contactor 155, thereby coupling inverter circuit 40 and the AC signal output on lines 40-1 to 40-3 to utility power grid 159. Power converter 100 thus enters a normal operating mode, in which current, but not voltage, is adjusted and controlled. Power converter 100 does not return to voltage control mode unless AC signal voltage 614 falls outside the desired band 610. In addition, during normal operation, AC signal current 720 is optionally synchronized with utility AC voltage 730, as discussed in greater detail below with reference to FIGS. 8-11.

Figure 8:
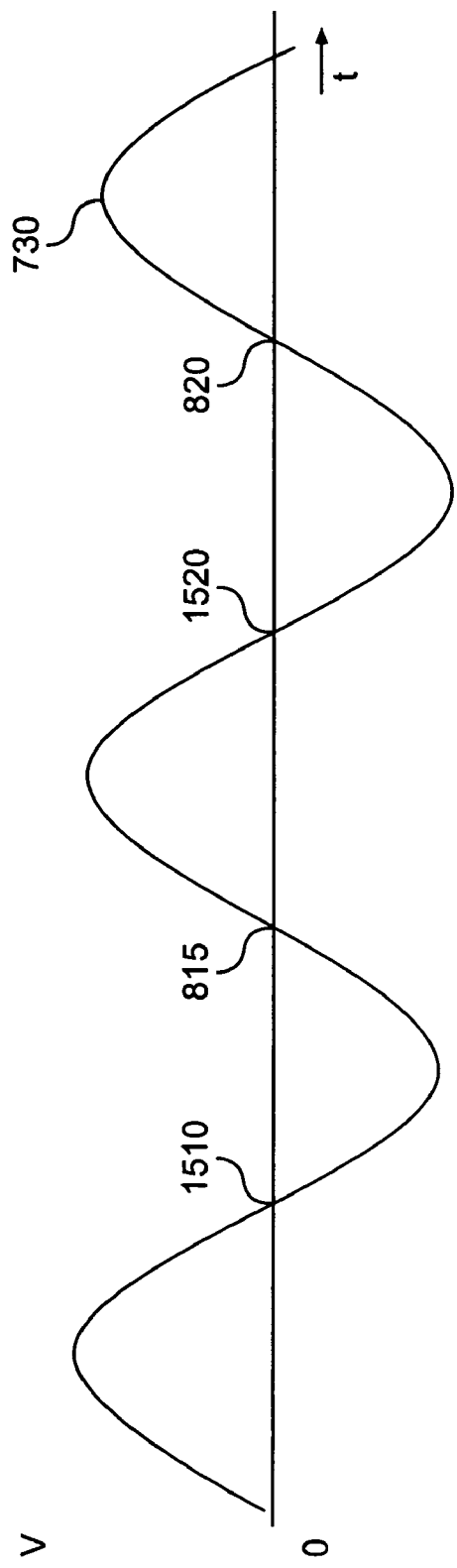
FIG. 8 illustrates a further waveform consistent with an aspect of the present disclosure.
Figure 9:
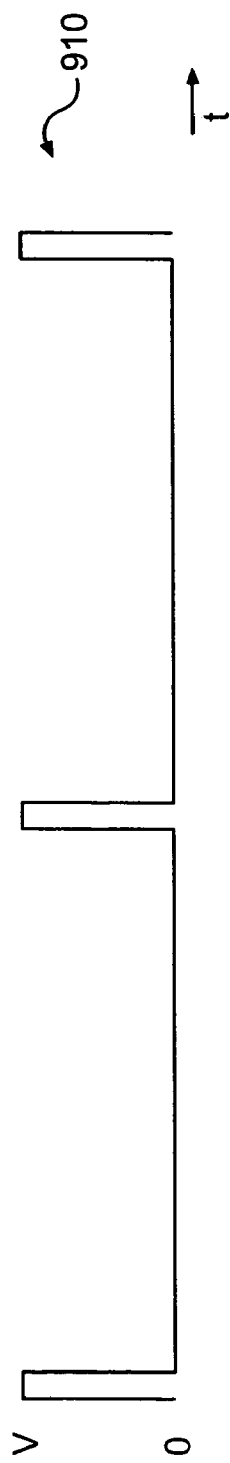
FIG. 9 illustrates a pulse signal in accordance with a further aspect of the present disclosure.

FIG. 8 illustrates AC utility voltage 730 sensed by voltage transducer 157. Utility AC signal voltage 730 is a substantially sinusoidal voltage waveform, as generally understood, and has an instantaneous voltage that changes with time. At points 815 and 820, the positive "zero crossings", the instantaneous voltage of utility AC signal voltage 730 changes from a negative value to a positive value. A pulse generating circuit 80 senses these zero crossings of utility AC signal voltage 730, and typically outputs a pulse (see pulse signal 910 in FIG. 9) in response to each. The pulses are fed to the control circuit 50, which associates a "start point" of an internally generated sinusoidal waveform 1100 (see FIG. 11) and corresponding "start current" of the AC signal current 720 with each pulse, thereby synchronizing the AC signal current 720 with the zero crossing of the AC utility voltage.

Figure 10:
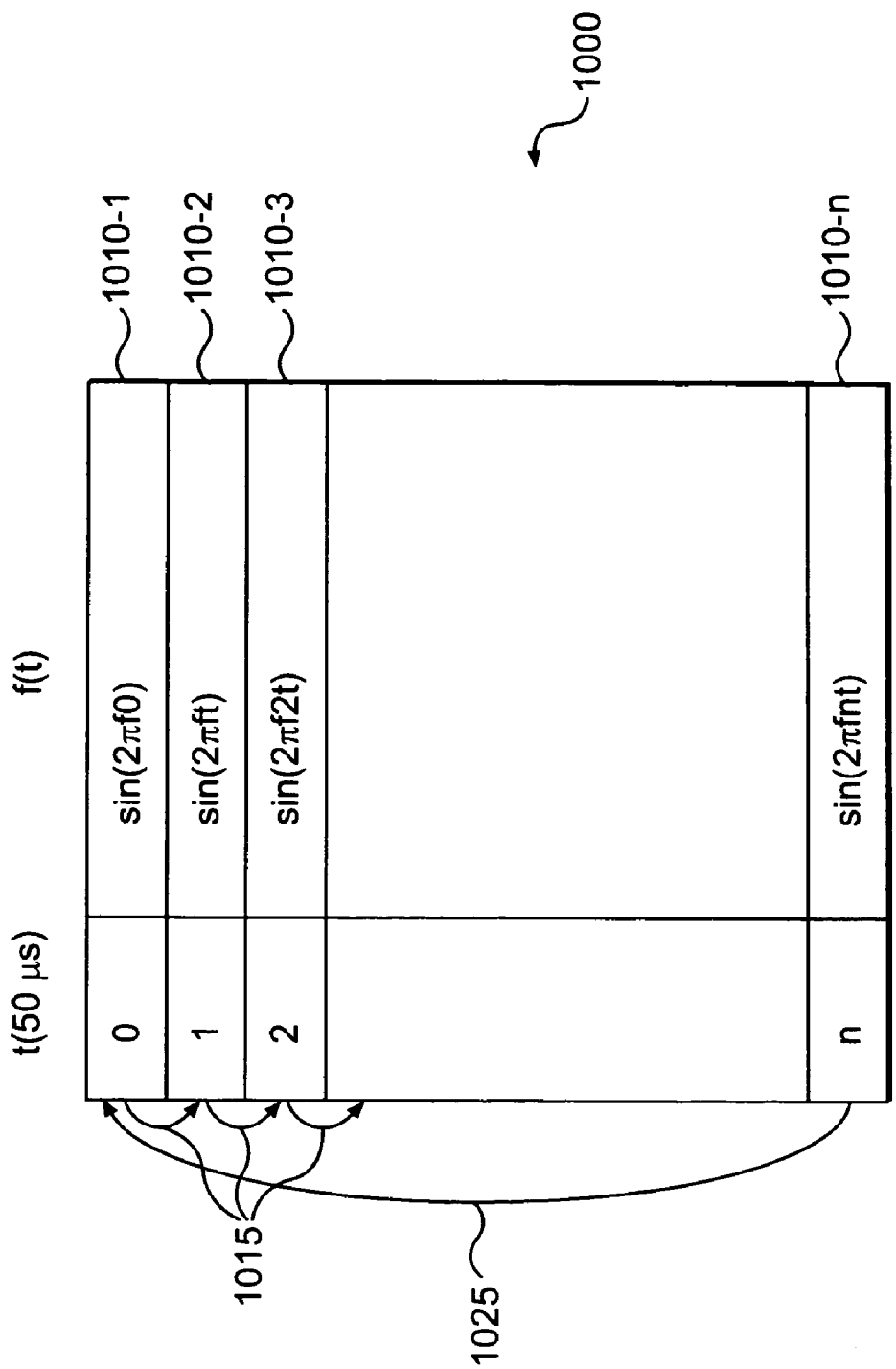
FIG. 10 illustrates a look-up table consistent with an additional aspect of the present disclosure.
Figure 11:
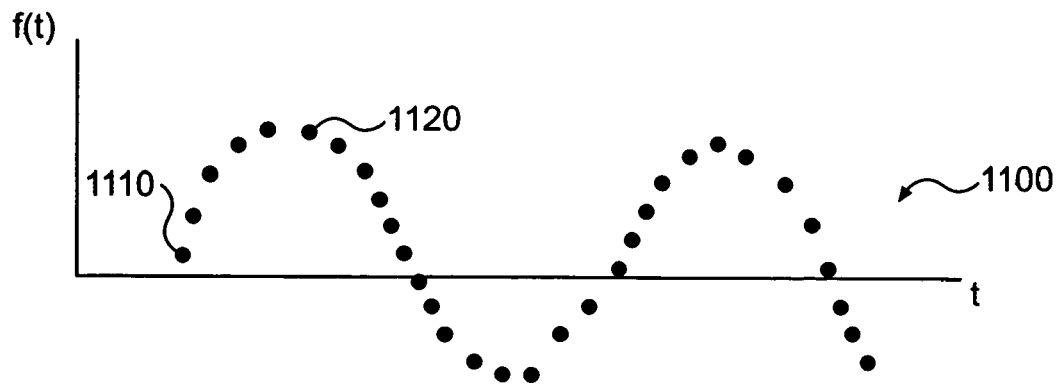
FIG. 11 shows a waveform representation in accordance with another aspect of the present disclosure.

In greater detail, the sinusoid waveform representation 1100 (see FIG. 11) is generated from information stored in a memory, such as look up table 1000 in control circuit 50 and shown in FIG. 10. In the present example, table 1000 includes rows 1010-1 to 1010-n, each of which stores a time value in 50 microsecond increments, and a corresponding temporal function, such as sine function value f(t), where f(t) is equal to sin(2π ft). Control circuit 50 is configured to sequentially read each sine function value at 50 microsecond intervals, for example, as indicated by arrows 1015 in FIG. 10. Once the last row of table 1000 is reached, control circuit 50 cycles back (arrow 1025) to the first row 1010-1 or start point in this instance, and sequentially reads out remaining sine function values as before. As a result, a series of points constituting sinusoid waveform representation 1100 are obtained as shown in FIG. 11, and the waveform is repeated with each cycle through table 1000.

Figure 12:
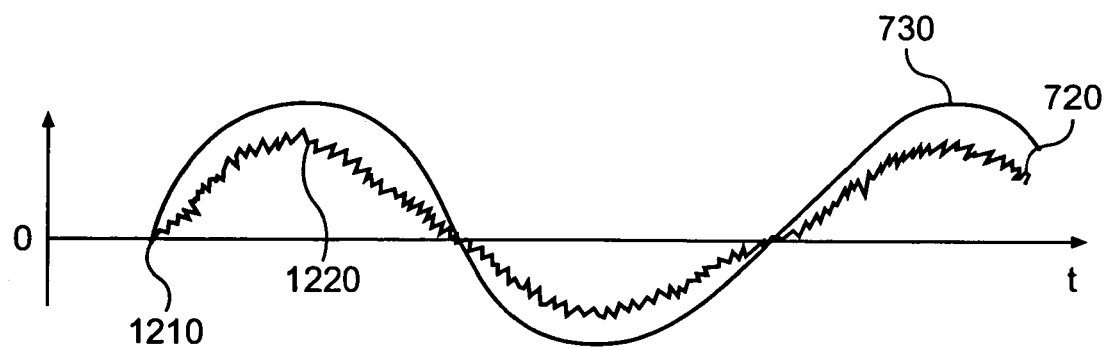
FIG. 12 illustrates a waveform consistent with a further aspect of the present disclosure.

By way of further example, the start point of sinusoidal waveform representation 1100 corresponds to the row which begins the read out cycle of table 1000, as noted above. In FIG. 11, the start point can be point 1110, at which particular control signals are supplied to the transistors of inverter circuit 40 to start the output AC signal at an instantaneous current corresponding to a particular start voltage. As shown in FIG. 12, this start current can be zero (point 1210), from which the rest of AC signal current 720 propagates in time, i.e., AC signal 720 conforms to a temporal function, which in this instance is substantially sinusoidal. Other start points, and start currents can be set by control circuit 50, however. For example, the start point can be set to another point 1120 on sinusoidal waveform representation 1100 associated with a different row in table 1000, to thereby obtain a different start current point 1220 in FIG. 12. In this case, control circuit 50 again sequentially reads sine function values from table 1000, but begins each read out cycle from the new starting point. Accordingly, by changing the start point of the read out cycle of table 1000, a desired start current of AC signal current 720 can be set to coincide with each pulse output from pulse signal generating circuit 80, and thus be synchronized with the zero crossing of AC utility voltage 730.

Figure 13:
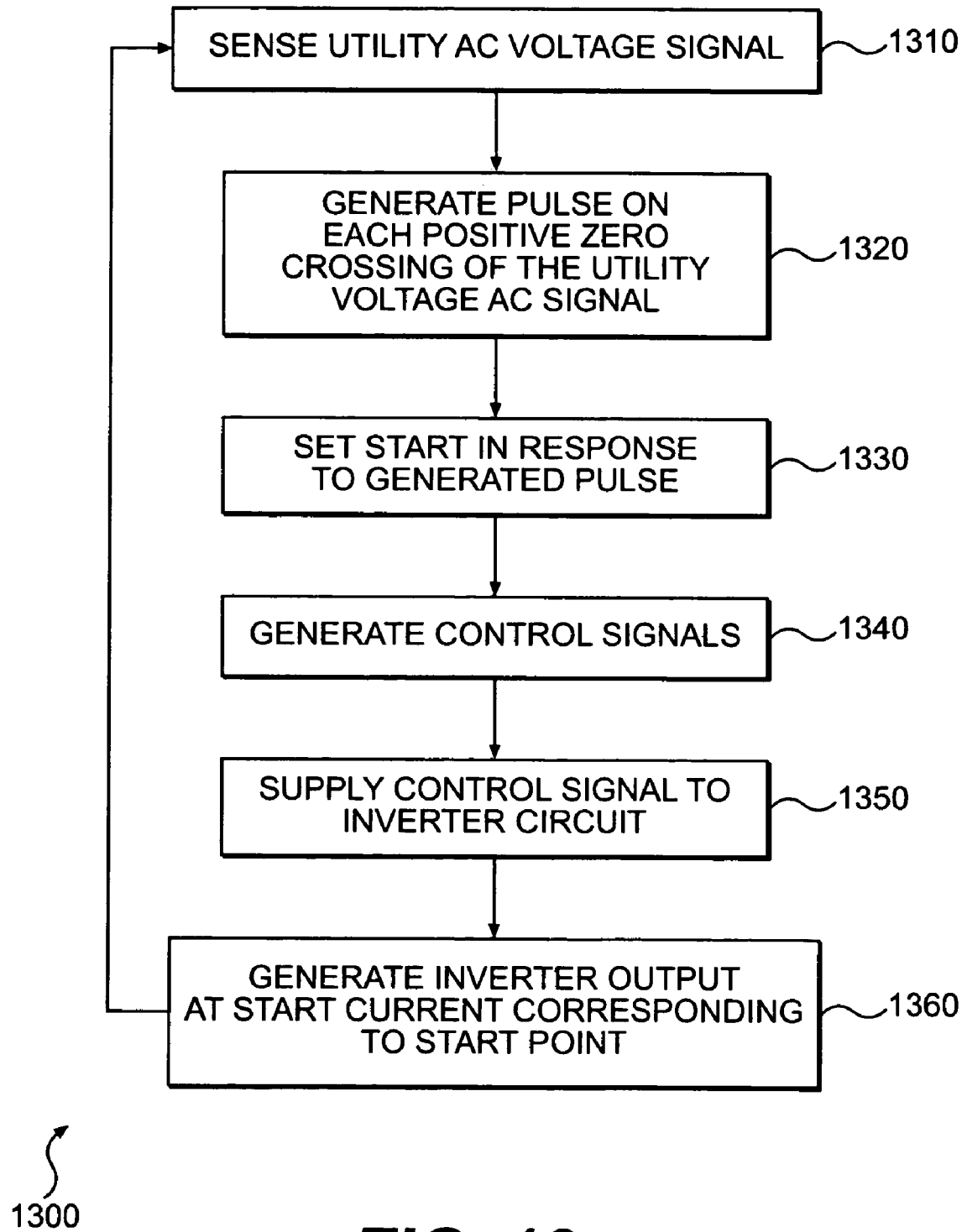
FIG. 13 illustrates a flowchart in accordance with an additional aspect of the present disclosure.

The method for synchronizing the AC signal current 720 with the AC utility voltage 730 will next be described in connection with flow chart 1300 shown in FIG. 13. In step 1310, the AC utility voltage 730 is sensed by voltage transducer circuit 157, and a voltage sense signal is provided to pulse signal generating circuit 80 on line 171 (see FIG. 2). A pulse signal 910 (see FIG. 9) is then generated by pulse generating circuit 80 in response to each positive zero crossing of the AC utility voltage 730 (step 1320). The pulse signal 910 is supplied to control circuit 50, which sets the start point of the sinusoid waveform representation 1100 and the read out cycle from table 1000 to coincide with the zero crossing of the utility AC signal (step 1330).

Accordingly, the read out cycle from table 1000 is set to begin at a start point that generates control signals (step 1340) corresponding to a zero inverter output current. The control signals are supplied to the bases of transistors in inverter circuit 40 (step 1350), which, in turn, generate a zero start current corresponding to the start point stored in table 1000 (step 1360). As a result, the instantaneous current of the AC signal is adjusted or set to a zero start current with each positive zero crossing of the AC utility voltage 730, but can also be set to other start points and corresponding start voltages. Accordingly, the AC signal current output from inverter circuit 40 will thereafter be synchronized with the AC utility voltage 730. Although the instantaneous voltage can be controlled or adjusted as noted above in response to the pulses output from pulse generating circuit 80, the pulses can be used to adjust other parameters associated with the AC signal.

INDUSTRIAL APPLICABILITY

Consistent with the present disclosure, a power converter for providing back-up power is coupled to a load and a utility power grid. During normal operation, current associated with AC output of the power converter is synchronized with an AC utility voltage, and the power converter is in a-current control mode in which the output current is monitored and controlled, but not the voltage. In the event of a fault in the utility power grid, however, the power converter is decoupled from the utility power grid, and the power converter enters a voltage control mode in which the voltage output from the power converter is monitored and controlled to be within a desired band. Once the voltage is within the desired band, the power converter returns to current control mode even though the power converter remains decoupled from the utility power grid.

Although synchronization is described above in connection with the positive zero crossing of the AC utility voltage 730, it is understood that the AC signal current may be synchronized to the "negative zero crossings" in which the instantaneous AC utility voltage changes from a positive value to a negative value (e.g., points 1510 and 1520 in FIG. 8).

Moreover, although the present disclosure discloses control of current and voltage of an AC signal present on line 40-1, it is understood that similar control can be achieved for the current and voltage of the AC signals present on lines 40-2 and 40-3 in a manner similar to that described above, so that the current and voltage of a three-phase AC signal output from power converter 100 can be obtained.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A method of controlling an AC signal, the AC signal being supplied to a load and selectively supplied to a utility grid, in response to a fault in the utility grid, the method comprising:
   decoupling the AC signal from the utility grid;
   determining whether a voltage associated with the AC signal is within a desired band;
   adjusting the voltage associated with the AC signal when the AC signal is outside the desired band;
   comparing a magnitude of a current associated with the AC signal with a desired current value to thereby obtain a comparison result; and
   adjusting the current associated with the AC signal in response to the comparison result when the voltage associated with the AC signal is within the desired band.

2. A method of controlling an AC signal in accordance with claim 1, wherein the magnitude is an instantaneous magnitude of the current associated with the AC signal, and the desired current value is associated with a predetermined time interval.

3. A method of controlling an AC signal in accordance with claim 2, wherein the desired current value is one of a plurality of desired current values, each of the plurality of desired current values being stored in a memory.

4. A method of controlling an AC signal in accordance with claim 1, wherein the AC signal is a first AC signal and a utility generated AC signal present in the utility grid is a second AC signal, wherein when the utility grid is operational, the method further includes:

supplying the first AC signal to the utility grid; and
synchronizing the first AC signal with the second AC signal.

5. A method of controlling an AC signal in accordance with claim 4, further including:
generating a pulse signal in response to a change in a value of an instantaneous voltage of the second AC signal; and
setting an instantaneous current of the first AC signal to a start current in response to the pulse signal, wherein the first AC signal conforms to a temporal function having a start point, and the start current is associated with the start point.

6. A method of controlling an AC signal in accordance with claim 5, wherein the change in the value is a change from a negative value of the instantaneous voltage of the second AC signal to a positive value of the instantaneous voltage of the second AC signal.

7. A method of controlling an AC signal in accordance with claim 5, wherein the change in the value is a change from a positive value of the instantaneous voltage of the second AC signal to a negative value of the instantaneous voltage of the second AC signal.

8. A method of controlling an AC signal in accordance with claim 1, wherein the AC signal is output from an inverter circuit, and the decoupling of the AC signal from the utility grid includes decoupling the inverter circuit from the utility grid.

9. A method of controlling an AC signal in accordance with claim 1, wherein the AC signal is output from an inverter circuit, the inverter circuit including first and second transistors, the first transistor being coupled to a first conductor, the first conductor being at a first potential, and the second transistor being coupled to a second conductor, the second conductor being at a second potential less than the first potential, the AC signal being output on a line coupled to the first and second transistors, the step of adjusting the voltage including:
when the voltage associated with the AC signal is less than the desired band, turning on the first transistor and turning off the second transistor to increase the voltage associated with the AC signal to be within the desired band; and
when the voltage associated with the AC signal is greater than the desired band, turning off the first transistor and turning on the second transistor to decrease the voltage associated with the AC signal to be within the desired band.

10. A method of controlling an AC signal in accordance with claim 1, wherein an inverter circuit includes first and second transistors, the first transistor being coupled to a first conductor, the first conductor being at a first potential, and the second transistor being coupled to a second conductor, the second conductor being at a second potential less than the first potential, the AC signal being output on a line coupled to both the first and second transistors, the step of adjusting the current including:
turning on the first transistor and turning off the second transistor when the comparison result indicates that the magnitude of the current associated with the AC signal is less than the desired band; and
turning off the first transistor and turning on the second transistor when the comparison result indicates that the magnitude of the current associated with the AC signal is greater than the desired band.

11. A power control system comprising:
an AC signal source, the AC signal source being coupled to a load, and generating an AC signal;
a switch circuit configured to selectively couple the AC signal source to a utility grid;
a control circuit configured to compare a magnitude of the current associated with the AC signal with a desired current value to obtain a comparison result; and
the control circuit coupled to the AC signal source, wherein when a voltage associated with the AC signal is outside a desired band, the control circuit is configured to control the switch circuit to decouple the AC signal source from the utility grid, and to adjust the voltage associated with the AC signal when the AC signal is outside the desired band and to adjust the current associated with the AC signal in response to the comparison result when the voltage associated with the AC signal is within the desired band.

12. A power control system in accordance with claim 11, wherein the magnitude of the current associated with the AC signal is an instantaneous magnitude of the current associated with the AC signal, and the desired current value is associated with a predetermined time interval.

13. A power control system in accordance with claim 11, wherein the control circuit includes a memory, and the desired current value is one of a plurality of desired current values, each of the plurality of desired current values being stored in the memory.

14. A power control system in accordance with claim 11, wherein the AC signal is a first AC signal and a utility generated AC signal present in the utility grid is a second AC signal, and
when the utility grid is operational, the control circuit further controls the switch circuit to couple the first AC signal to the utility grid, and synchronize the first AC signal with the second AC signal.

15. A power control system in accordance with claim 4, further including:
a pulse generating circuit configured to output a pulse signal to the control circuit in response to a change in a value of an instantaneous voltage associated with the second AC signal, wherein the control circuit is configured to set an instantaneous current of the first AC signal to a start current in response to the pulse signal, the first AC signal conforming to a temporal function having a start point, and the start current being associated with the start point.

16. A power control system in accordance with claim 15, wherein the change in the value is a change from a negative value of the instantaneous voltage of the second AC signal to a positive value of the instantaneous voltage of the second AC signal.

17. A power control system in accordance with claim 15, wherein the change in the value is a change from a positive value of the instantaneous voltage of the second AC signal to a negative value of the instantaneous voltage of the second AC signal.

18. A power control system in accordance with claim 11, wherein the AC signal source includes:
first and second conductors at first and second potentials, respectively, the second potential being less than the first potential; and
an inverter circuit having first and second transistors, the first transistor being coupled to the first conductor, and the second transistor being coupled to the second conductor, a phase of the AC signal being output on a line coupled to both the first and second transistors.

19. A power control system in accordance with claim 18, wherein, when the voltage associated with the AC signal is less than the desired band, the control circuit is configured to supply first control signals to turn on the first and transistor and turn off the second transistor to increase the voltage associated with the AC signal to be within the desired band; and when the voltage associated with the AC signal is greater than the desired band, the control circuit is configured to supply second control signals to turn off the first transistor and turn on the second transistor to decrease the voltage associated with the AC signal to be within the desired band.

20. A power control system in accordance with claim 11, wherein the AC signal source includes:

first and second conductors at first and second potentials, respectively, the second potential being less than the first potential; and an inverter circuit having first and second transistors, the first transistor being coupled to the first conductor, and the second transistor being coupled to the second conductor, a phase of the AC signal being output on a line coupled to both the first and second transistors, when the comparison result indicates that the magnitude of the current is less than the desired value, the control circuit supplies first control signals to turn on the first transistor and turn off the second transistor to increase the current to be substantially equal to the desired value, and when the comparison result indicates that the magnitude of the current is greater than the desired value, the control circuit supplies second control signals to turn off the first transistor and turn on the second transistor to decrease the current to be substantially equal to the desired value.

21. A power control system, comprising:

an inverter circuit configured to receive a DC signal and supply an AC signal to a load;

a current transducer circuit configured to receive the AC signal and output a current sense signal in response to a current associated with the AC signal;

a voltage transducer circuit configured to receive the AC signal and output a voltage sense signal in response to a voltage associated with the AC signal;

a switch circuit configured to selectively supply the AC signal to a utility grid;

a pulse generating circuit configured to output a pulse signal in response to a utility AC signal present in the utility grid;

a control circuit configured to receive the current sense signal, the voltage sense signal and the pulse signal, and output control signals to the inverter circuit in response thereto; and when the switch circuit decouples the AC signal from the utility grid, the control circuit is configured to control the voltage associated with the AC signal when the AC signal is outside a desired band and to control the current associated with the AC signal when the voltage associated with the AC signal is within the desired band.

22. A power control system in accordance with claim 21, wherein when the switch circuit supplies the AC signal to the utility grid, the control circuit is configured to control the current associated with the AC signal.

23. A power control system in accordance with claim 21, wherein the voltage transducer circuit is a first voltage transducer circuit and the voltage sense signal is a first voltage sense signal, the power control system further including a second voltage transducer circuit, the second voltage transducer circuit being configured to supply a second voltage sense signal to the pulse generating circuit, the second voltage sense signal being indicative of the voltage associated with the AC signal.

24. A power control system in accordance with claim 21, wherein the control circuit is configured to synchronize the AC signal with the utility AC signal in response to the pulse signal.

25. A power control system in accordance with claim 21, wherein the pulse generating circuit outputs the pulse signal in response to a change in a value of an instantaneous voltage associated with the utility AC signal, and the control circuit is configured to set an instantaneous current of the AC signal to a start current in response to the pulse signal, the AC signal conforming to a temporal function having a start point, and the start current being associated with the start point.

26. A power control system in accordance with claim 25, wherein the change in value is a change from a negative value of the instantaneous voltage of the utility AC signal to a positive value of the instantaneous voltage of the utility AC signal.

27. A power control system in accordance with claim 25, wherein the change in value is a change from a positive value of the instantaneous voltage of the utility AC signal to a negative value of the instantaneous voltage of the utility AC signal.

28. A power control system in accordance with claim 21, further including:

first and second conductors at first and second potentials, respectively, the second potential being less than the first potential, wherein the inverter circuit includes first and second transistors, the first transistor being coupled to the first conductor, and the second transistor being coupled to the second conductor, the AC signal being output on a line coupled to both the first and second transistors.

29. A power control system in accordance with claim 28, wherein when the voltage associated with the AC signal is greater than a desired band, the control circuit is configured to adjust the voltage associated with the AC signal to be within the desired band by supplying first control signals to turn off the first and transistor and turn on the second transistor, and when the voltage associated with the AC signal is less than the desired band, the control circuit is configured to adjust the voltage associated with the AC signal to be within the desired band by supplying second control signals to turn on the first transistor and turn off the second transistor.

30. A power control system in accordance with claim 28, wherein when the voltage associated with the AC signal is within a desired band and the current associated with the AC signal is below a desired current value, the control circuit is configured to adjust the current associated with the AC signal to be substantially equal to the desired current by supplying first control signals to turn on the first transistor and turn off the second transistor, and when the voltage associated with the AC signal is within the desired band and the current associated with the AC signal is above the desired current value, the control circuit is configured to adjust the current associated with the AC signal to be substantially equal to the desired current by supplying second control signals to turn off the first transistor and turn on the second transistor.

* * * * *

UNITED STATES PATENT AND TRADEMARK OFFICE
CERTIFICATE OF CORRECTION

PATENT NO. : 7,417,336 B2  Page 1 of 1
APPLICATION NO. : 10/929689
DATED : August 26, 2008
INVENTOR(S) : James Johnson It is certified that error appears in the above-identified patent and that said Letters Patent is hereby corrected as shown below:

Please correct the Specification as follows:
Column 5, line 14, delete "Ti" and insert -- T1 --.

Please correct the Claims as follows:
Column 12, line 34, in Claim 15, delete "4," and insert -- 14, --.

Signed and Sealed this

Twenty-fourth Day of February, 2009

JOHN DOLL
*Acting Director of the United States Patent and Trademark Office*